(12) United States Patent
Osterloh et al.

(10) Patent No.: US 11,871,343 B2
(45) Date of Patent: *Jan. 9, 2024

(54) OPTIMIZED PARENT AND PATH SELECTION FOR BATTERY POWERED DEVICES WITHIN A WIRELESS NETWORK

(71) Applicant: ITRON, INC., Liberty Lake, WA (US)

(72) Inventors: Christopher Lloyd Osterloh, Waseca, MI (US); Keith Wayne Barnes, Waseca, MI (US); Thomas Uhling, Spokane Valley, WA (US)

(73) Assignee: ITRON, INC., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,448

(22) Filed: Aug. 15, 2022

(65) Prior Publication Data
US 2022/0394611 A1 Dec. 8, 2022

Related U.S. Application Data

(63) Continuation of application No. 16/930,228, filed on Jul. 15, 2020, now Pat. No. 11,452,037.

(51) Int. Cl.
*H04W 52/02* (2009.01)
*H04W 40/10* (2009.01)

(52) U.S. Cl.
CPC ....... *H04W 52/0206* (2013.01); *H04W 40/10* (2013.01)

(58) Field of Classification Search
CPC .......................... H04W 40/10; H04W 52/0206
USPC ......................................................... 370/311
See application file for complete search history.

(56) References Cited

U.S. PATENT DOCUMENTS

2020/0264236 A1 8/2020 Gamroth

*Primary Examiner* — Gbemileke J Onamuti
(74) *Attorney, Agent, or Firm* — Artegis Law Group, LLP

(57) ABSTRACT

Techniques for path selection in a network include a first node in a mesh network receiving, from a second node in the mesh network, a first battery life metric for a path through the mesh network, determining a value representing a remaining battery life of the first node, calculating a second battery life metric based on at least one of the first battery life metric for the path or the value representing the remaining battery life for the first node, and transmitting, to a third node in the mesh network, the second battery life metric.

20 Claims, 4 Drawing Sheets

OPTIMIZED PARENT AND PATH SELECTION FOR BATTERY POWERED DEVICES WITHIN A WIRELESS NETWORK

CROSS-REFERENCE TO RELATED APPLICATIONS

The present application is a continuation of United States application titled "OPTIMIZED PARENT AND PATH SELECTION FOR BATTERY POWERED DEVICES WITHIN A WIRELESS NETWORK," filed on Jul. 15, 2020, and having Ser. No. 16/930,228. The subject matter of this related application is hereby incorporated herein by reference.

BACKGROUND

Field of the Various Embodiments

Various embodiments of the present disclosure relate generally to wireless network communications and, more specifically, to optimized parent and path selection for battery powered devices within a wireless network.

Description of the Related Art

A conventional wireless network includes a plurality of nodes configured to communicate with one another. In certain types of heterogeneous wireless networks, different types of nodes communicate and interact with one another within the network, including mains powered device (MPD) nodes and battery powered device (BPD) nodes. MPD nodes typically are coupled to a power grid and have continuous access to power (except during power outages), which allows MPD nodes to receive and transmit data more or less continuously. On the other hand, BPD nodes are powered by batteries and therefore have only a finite supply of power. To manage the finite supply of power, BPD nodes normally remain in a powered-down state and power on only at intermittent intervals.

During initialization, MPD nodes and BPD nodes perform a discovery process to determine the existence of nearby nodes within the network and establish communication links (or "pair") with one or more other nodes that allow the node to transmit and receive messages from another device, such as a remotely located control center. In performing this process, a given node usually transmits a discovery beacon request (DBR) to one or more nodes, and, upon receiving the DBR, a receiving node transits a discovery beacon (DB) back to the given node. The DB includes information that permits the two nodes to pair.

Because MPD nodes can operate continuously, pairing with MPD nodes is considerably easier than pairing with BPD nodes, which are powered down far more often than not. Accordingly, when a given BPD node is operational, the BPD node preferentially pairs with a nearby MPD node in order to quickly gain access to the network. Among other things, quickly completing the discovery process conserves battery life because the discovery process can consume quite a bit of energy. In many operating scenarios, though, a BPD node cannot quickly locate a nearby MPD node during the discovery process. For example, a BPD node could reside at the fringes of a wireless network where communications with centrally located MPD nodes are difficult or impossible. To address this type of situation, a given BPD node can be configured to automatically discover and pair with an upstream BPD node that has already gained network access.

Traditionally, BPD nodes, when installed, are guaranteed to last in the field for a particular duration of time, such as twenty years. In order to manage battery life over the guaranteed lifetime of the product, conventional BPD nodes communicate in a deterministic manner. For example, a BPD node may transmit a message every fifteen seconds, where each message included a fixed number of bits. Because the BPD node transmits messages at regular intervals, and each message has a fixed length, the amount of energy consumed for each message may be accurately determined. The total energy consumed over the guaranteed lifetime may then be determined by multiplying the energy consumption per message times the number of messages transmitted over the guaranteed lifetime of the BPD node. The manufacturer may then select a battery for installation in the BPD node, where the battery capacity is able to supply this total energy consumed over the guaranteed lifetime. In practice, however, the battery life may be reduced below the guaranteed lifetime of the BPD node due to several factors.

First, the discovery process described above may occur more often than anticipated. This situation may arise for a BPD node that resides within the wireless network where communications quality is poor. As a result, the BPD node may need to perform multiple discovery processes to pair with another node. Further, the communications channel may drop between the BPD node and the paired node, causing the BPD node to perform another discovery process to reestablish communications with another node. These additional discovery processes consume energy, leading to shorter battery life.

Second, a BPD node may be tasked to relay network messages for MPD nodes and/or other BPD nodes within the wireless network. Routing messages for other nodes also consumes energy, further reducing battery life. In addition, channel hopping sequences change dynamically over time. When one or more channel hopping sequences change, the number and size of messages relayed by a particular BPD node may likewise increase and/or decrease over time. Such increases and decrease may result from changes in radio frequency signal propagation conditions, adding devices to the wireless network, removing devices from the wireless network, and/or the like. As a result, the battery life of the battery in the BPD node may be difficult to determine with accuracy.

The overall consequence is that many BPD nodes expend a great deal of energy during discovery and when routing data for other nodes, which can substantially reduce the operational lifetime of those BPD nodes. As a result, BPD nodes may fail prior to the guaranteed lifetime, leading to expensive repair and/or replacement costs.

As the foregoing illustrates, what is needed in the art are more effective processes for BPD nodes for managing battery consumption in a wireless network.

SUMMARY

Various embodiments of the present disclosure set forth a first node that resides within a wireless network, where the first node computes a metric based on the remaining battery life of one or more nodes in a path that includes the first node. The first node includes a memory storing instructions; and a processor that is coupled to the memory. When executing the instructions, the processor receives data associated with remaining battery life of one or more other nodes that reside within the wireless network. When executing the instructions, the processor further determines a value representing a remaining battery life of the first node. When executing the instructions, the processor further computes a metric based on the remaining battery life of the one or more other nodes and the remaining battery life of the first node. When executing the instructions, the processor further transmits the metric to a second node within the wireless network.

Various embodiments of the present disclosure set forth a first node that resides within a wireless network, where the first node selects a parent node based on a metric that represents remaining battery life of one or more nodes in a path that includes the parent node. The first node includes a memory storing instructions; and a processor that is coupled to the memory. When executing the instructions, the processor receives a first metric from a first potential parent node included in the wireless network, the first metric indicating a remaining battery life associated with a first path to a head node that includes the first potential parent node. When executing the instructions, the processor further receives a second metric from a second potential parent node included in the wireless network, the second metric indicating a remaining battery life associated with a second path that includes the second potential parent node. When executing the instructions, the processor further selects a parent node from the first potential parent node or the second potential parent node based on the first metric and the second metric.

Other embodiments include, without limitation, a method that implements one or more aspects of the disclosed techniques, and one or more computer readable media including instructions for performing one or more aspects of the disclosed techniques.

At least one technical advantage of the disclosed techniques relative to the prior art is that, with the disclosed techniques, nodes within a wireless network can select a parent and a path based on remaining battery life of nodes in the wireless network. As a result, energy consumption of nodes in the wireless network is managed with greater accuracy, thereby extending the operational lifetime of BPD nodes. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
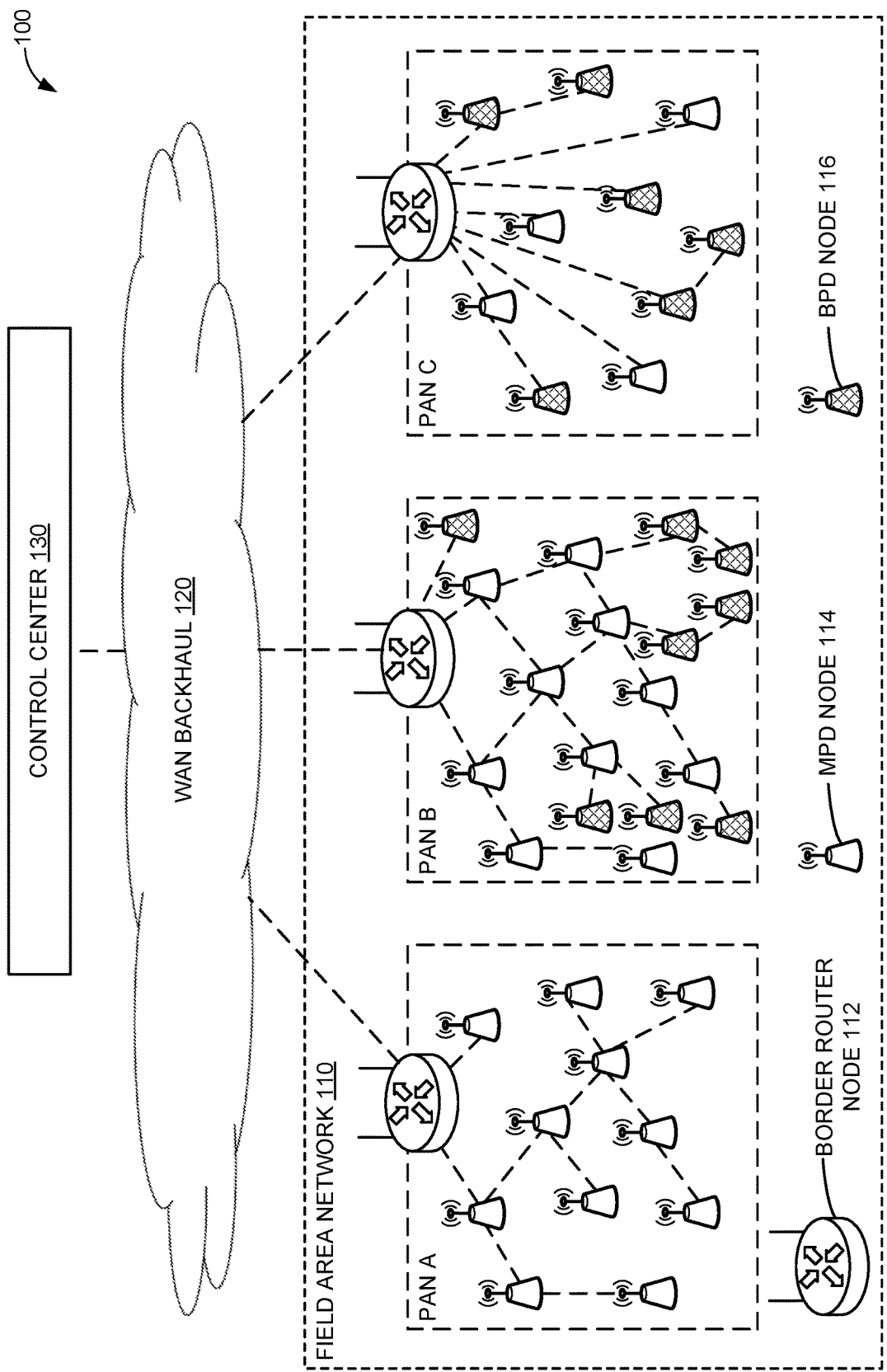
FIG. 1 illustrates a network system configured to implement one or more aspects of the various embodiments.

In the following description, numerous specific details are set forth to provide a more thorough understanding of the various embodiments. However, it will be apparent to one of skilled in the art that the inventive concepts may be practiced without one or more of these specific details.

The disclosed techniques apply to any system of networked nodes, where at least some nodes are battery powered. Such systems include a wireless network of utility meters, Internet of things (IoT) devices, and/or the like. As noted above, conventional parent and path selection processes implemented by a conventional node suffers from numerous inefficiencies. Among other things, conventional processes for parent and path selection do not consider the remaining battery life of the nodes in the selected path. As a result, BPD nodes that consume excessive energy due to repeated discovery processes and/or routing data for other nodes may consume excessive energy relative to other nodes in the wireless network. Such excessive energy consumption shortens the operational lifetime of BPD nodes, leading to leading to expensive repair and/or replacement costs.

To address these issues, various embodiments include a wireless network that includes a plurality of nodes, each of which is configured to implement an improved parent and path selection process in order to efficiently and reliably manage battery life of the plurality of nodes. To implement the parent and path selection process, a given node implements a technique to determine a metric based on remaining battery life of the nodes in the currently selected path. The metric may be a composite of the battery metrics for the given node and the upstream nodes in the currently selected path. Upon request from another node, the given node transmits the metric to the requesting node. As a result, the requesting node is able to determine the desirability of the path that includes the given node, based upon the remaining battery life of the nodes in the path that includes the given node. The requesting node may further determine the desirability of the path that includes the given node based upon metrics not related to battery life, including remaining message capacity, remaining child node connections, number of hops to a control center, signal quality, and/or the like.

When a given node selects a new path, the node transmits requests to multiple nodes, each of which is a potential parent node for the given node. In response to the requests, each potential parent node transmits a metric to the requesting node, where the metric is indicative of the remaining battery life of the nodes in the path that includes the respective potential parent node. After receiving the metrics from the potential parent nodes, the given node selects a parent node, and corresponding path, based on the metrics. More specifically, the given node selects a path, where at least one node on the selected path is less likely to prematurely exhaust the remaining battery capacity of the node, relative to the nodes in the other potential paths. As a result, the given node selects a path that optimizes battery consumption of the various BPD nodes in the wireless network. An overview of the system according to the present disclosure is now described.

System Overview

FIG. 1 illustrates a network system configured to implement one or more aspects of the present embodiments. As shown, network system 100 includes a field area network (FAN) 110, a wide area network (WAN) backhaul 120, and a control center 130. FAN 110 is coupled to control center 130 via WAN backhaul 120. Control center 130 is configured to coordinate the operation of FAN 110. In some embodiments, control center 130 is also referred to herein as the head node or the head end.

FAN 110 includes personal area network (PANs) A, B, and C. PANs A and B are organized according to a mesh network topology, while PAN C is organized according to a star network topology. More generally, each of PANs A, B, and C may be organized according to any network topology, including a mesh network topology, a star network topology, a ring network topology, and/or the like. Further, each of PANs A, B, and C may be organized according to a hybrid network topology based on any technically feasible combination of a mesh network topology, a star network topology, a ring network topology, and/or the like. Each of PANs A, B, and C includes at least one border router node 112 and one or more mains powered device (MPD) nodes 114. PANs B and C further include one or more battery powered device (BPD) nodes 116. In some embodiments, one or more border router nodes 112 may be battery powered.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down for extended periods of time in order to conserve battery power. MPD nodes 114 and BPD nodes 116 are configured to gather sensor data, process the sensor data, and communicate data processing results and other information to control center 130. Border router nodes 112 operate as access points to provide MPD nodes 114 and BPD nodes 116 with access to control center 130.

Any of border router nodes 112, MPD nodes 114, and BPD nodes 116 are configured to communicate directly with one or more adjacent nodes via bi-directional communication links. The communication links may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels, the media access control (MAC) address of the node, and other information associated with the node.

Each node within a given PAN may implement a discovery protocol to identify one or more adjacent nodes or "neighbors." A node that has identified an adjacent, neighboring node may establish a bi-directional communication link with the neighboring node. Each neighboring node may update a respective neighbor table to include information concerning the other node, including the MAC address of the other node as well as a received signal strength indication (RSSI) of the communication link established with that node.

Nodes may compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above may operate as a source node, an intermediate node, or a destination node for the transmission of data packets. A given source node may generate a data packet and then transmit the data packet to a destination node via any number of intermediate nodes. The data packet may indicate a destination for the packet and/or a particular sequence of intermediate nodes to traverse in order to reach the destination node. In one embodiment, each intermediate node may include a forwarding database indicating various network routes and cost metrics associated with each route.

Nodes may transmit data packets across a given PAN and across WAN backhaul 120 to control center 130. Similarly, control center 130 may transmit data packets across WAN backhaul 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein.

Control center 130 includes one or more server machines (not shown) configured to operate as sources for, or destinations of, data packets that traverse within network system 100. The server machines may query nodes within network system 100 to obtain various data, including raw or processed sensor data, energy consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations.

Figure 2:
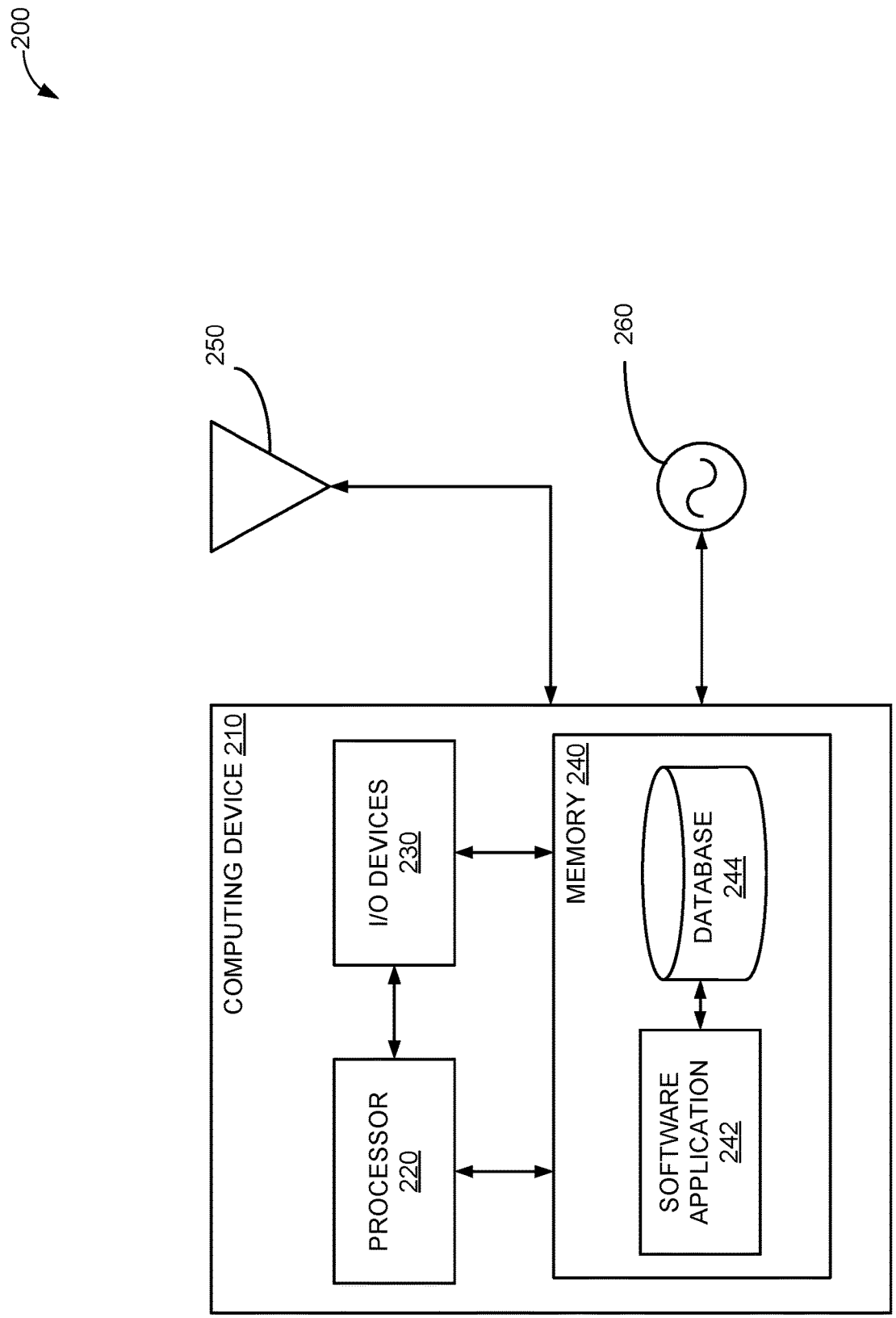
FIG. 2 illustrates a node configured to transmit and receive data within the network system of FIG. 1, according to various embodiments.

Nodes may likewise include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware. FIG. 2 illustrates an exemplary node that may operate within the network system 100.

FIG. 2 illustrates a node 200 configured to transmit and receive data within the network of FIG. 1, according to various embodiments. As shown, a node 200 includes a computing device 210 coupled to a transceiver 250 and an oscillator 260. Computing device 210 coordinates the operations of node 200. Transceiver 250 is configured to transmit and receive data packets across network system 100 using a range of channels and power levels. Oscillator 260 provides one or more oscillation signals according to which the transmission and reception of data packets can be scheduled. Node 200 may be used to implement any of border router nodes 112, MPD nodes 114, and BPD nodes 116 of FIG. 1.

Computing device 210 includes a processor 220, input/output (I/O) devices 230, and memory 240, coupled together. Processor 220 may include any hardware configured to process data and execute software applications, such as software application 242. In general, processor 220 retrieves and executes programming instructions stored in memory 240. Processor 220 may be any technically feasible form of processing device configured to process data and execute program instructions. Processor 220 could be, for example, one or more central processing units (CPUs), digital signal processors (DSPs), graphics processing units (GPUs), application-specific integrated circuits (ASICs), field-programmable gate arrays (FPGAs), and/or the like. Processor 220 stores and retrieves application data residing in the memory 240. Processor 220 is included to be representative of a single processor, multiple processors, a single processor having multiple processing cores, and the like. In operation, processor 220 is the master processor of node 200, controlling and coordinating operations of other system components. Memory 240 stores software applications and data for use by processor 220. Processor 220 executes software applications, such as software application 242, also referred to herein as software application programs, stored within memory 240 and optionally an operating system. In particular, processor 220 executes software instructions and then performs one or more of the functions and operations set forth in the present application.

Processor 220 may include a real-time clock (RTC) (not shown) according to which processor 220 maintains an estimate of the current time. The estimate of the current time may be expressed in Universal Coordinated Time (UTC), although any other standard of time measurement can also be used. I/O devices 230 include devices configured to receive input, devices configured to provide output, and devices configured to both receive input and provide output. Memory 240 may be implemented by any technically feasible storage medium.

Memory 240 includes, without limitation, a software application 242 and a database 244, coupled together. Software application 242 includes program instructions that, when executed by processor 220, performs any one or more of the computer-based techniques described herein. Software application 242 may also interface with transceiver 250 to coordinate the transmission and reception of data packets across network system 100 based on timing signals generated by oscillator 260. Database 244 may include various data structures retrieved by and/or stored by the software application 242.

In operation, software application 242 executing on processor 220 of node 200 implements the discovery process discussed above in conjunction with FIG. 1 in order to establish adjacency with one or more neighboring nodes. Software application 242 performs the discovery process under two conditions. First, software application 242 performs the discovery process when node 200 initially joins the wireless network, such as when node 200 is powered on. Second, software application 242 performs the discovery process at regular maintenance intervals, such as once per day, once per week, once per month, once per year, and/or the like. By performing the discovery process at regular maintenance intervals, software application 242 is able to change the route, also referred to herein as the path, from node 200 to control center 130 as conditions change over time. Nodes on the path between node 200 and control center 130 are referred to herein as upstream nodes. Conditions change over time due to various factors, including changes in radio frequency signal propagation conditions, adding devices to the wireless network, removing devices from the wireless network, and/or the like. In this manner, software application 242 dynamically selects new paths in order to optimize for signal quality, length of the path, remaining battery life of the nodes, and/or the like.

In order to consider remaining battery life during the discovery process, software application 242 performs two functions when selecting a path from node 200 to control center 130. First, software application 242 receives metrics related to remaining battery life of intermediate nodes between node 200 and control center 130. Software application 242 combines these metrics with metrics related to remaining battery life of node 200 and transmits the combined metrics to potential child nodes. Second, software application 242 selects a path based on metrics received from multiple potential parent nodes. These two functions are now described. As referred to herein, two adjacent nodes in the wireless network may have a parent-child node relationship. With a parent-child node relationship, the parent node has fewer intermediate nodes to reach control center 130 relative to the child node. Further, the child node transmits messages to and receives messages from control center 130 via the parent node.

With respect to the first function, software application 242 receives metrics related to remaining battery life of intermediate nodes between node 200 and control center 130. Software application 242 computes these metrics for node 200. The metrics may be any technically feasible measure related to battery life of a BPD node.

One exemplary metric is a battery exhaustion rate, also referred to herein as a battery burn rate. The battery burn rate measures a short-term average of daily battery consumption over a recent period, such as two months, three months, six months, and/or the like. A low battery burn rate is indicative of a node that experiences good signal quality when communicating with neighboring nodes, resulting in fewer discovery processes due to loss of signal and/or a node that relays relatively few messages for other nodes. On the other hand, a high battery burn rate is indicative of a node that experiences poor signal quality and/or relays a relatively large number of messages for other nodes. In general, a higher battery burn rate results in a shorter remaining battery life, relative to a lower battery burn rate. More specifically, assuming that the current battery burn rate continues at a relatively steady pace, the remaining battery life may be approximated by dividing the remaining battery capacity by the current battery burn rate.

Another exemplary metric is a measure of composite consumption of the battery over the guaranteed or target lifetime of node 200. The composite consumption is reflective of the total capacity of the battery in node 200, the age of node 200 in years, the target lifetime of node 200 in years, and the expected remaining battery lifetime. These values may be expressed as discrete values or as a percentage. In one example, if node 200 has been deployed for 6 years and has a 20-year target lifetime, then node 200 is at 6 years÷20 years=30% of the target lifetime, with 70% of the target lifetime remaining. Further, a typical BPD node 200 is deployed with a battery that has a total capacity in the range of 3 amp-hours-10 amp-hours. In one example, a BPD node 200 configured as a gas meter may be deployed with a battery that has a total capacity of approximately 3 amp-hours. In another example, a BPD node 200 configured as a water meter may be deployed with a battery that has a total capacity of approximately 6 amp-hours. If the battery in node 200 has a total capacity of 6 amp-hours and the remaining capacity is 2.1 amp-hours, then node 200 has a remaining capacity percentage 2.1 amp-hours÷6 amp-hours=35%. As a result, node 200 has a composite consumption of 35%÷70%=50%, indicating that the battery of node 200 has 50% of the remaining battery life remaining relative to the battery life needed to meet the target lifetime. In general, a composite consumption of less than 100% indicates that the battery is at risk of exhaustion prior to the target lifetime. A composite consumption of 100% indicates that the battery is expected to last until the target lifetime. A composite consumption of more than 100% indicates that the battery is expected to last longer than the target lifetime.

Yet another exemplary metric is an indication that a node is designated as a sacrificial node. A node that is designated as a sacrificial node is expected to be more heavily used for relaying messages for other nodes, even if such heavy use negatively impacts the total lifetime of the node. A node may be designated as a sacrificial node at the time of manufacture, during field installation of the node, by a remote command received from control center 130, by the node itself, and/or the like.

A node may be designated as a sacrificial device because the node is an MPD node that is not subject to battery depletion. Additionally or alternatively, a node may be designated as a sacrificial device because the device is specifically designed for relaying messages for other nodes as a primary purpose. Such nodes may not be subject to a guaranteed or target lifetime. Further, such nodes may include additional battery capacity to support increased energy consumption due to relaying a large volume of messages. Additionally or alternatively, a node may be designated as a sacrificial device because the device is unlikely to last until the target lifetime, due to prior energy consumption rates. Designating such a node as a sacrificial node may concentrate and reduce the number of nodes that fail prior to the target lifetime and allow other nodes to last until the target lifetime.

A node that is designated as a sacrificial node indicates the designation via any one or more techniques. A node designated as a sacrificial node may publish the designation as one of the metrics published to child nodes and/or potential child nodes. Additionally or alternatively, the node may publish a deration value based on the designation as a sacrificial node. The deration value may be expressed as a percentage a child node and/or potential child node may adjust the battery burn rate and/or the composite consumption by a certain deration value. A deration value of 0% indicates no deration, such as when a node is not designated as a sacrificial device. A deration value of 100% indicates that the node is designated as a sacrificial node, with little to no concern regarding remaining battery life, such as when the node is an MPD node. A high deration value, such as 80% or 90%, indicates that the node is designated as a sacrificial node, with somewhat reduced concern regarding remaining battery life, such as when the node is a BPD node with surplus battery capacity and/or a BPD node that is powered by a solar panel with a backup battery. Additionally or alternatively, the node may set the battery burn rate and/or the composite consumption to a fixed value based on the designation as a sacrificial node. Additionally or alternatively, the node may increase the value representing the remaining battery life of the potential parent node.

Additional metrics may include an indication of the number of additional messages that node 200 is able to relay for other nodes, a number of remaining child node connections that node 200 is able to accept, a path length indicating the number of hops from node 200 to control center 130, an indicator of signal quality currently experienced by node 200, and/or the like.

Node 200 transmits battery life metrics to child nodes and potential child nodes via any one or more technically feasible techniques. In one example, node 200 transmits a table or similar data structure that includes an entry for the metrics for node 200 and an additional entry for each node in the path to control center 130, where each additional entry includes the metrics for a corresponding intermediate node between node 200 and control center 130. Each entry in the table includes any one or more of battery burn rate, composite consumption, sacrificial node designation, sacrificial node deration value, remaining message capacity, remaining child node connections, number of hops to control center 130, signal quality, and/or the like, for the corresponding node. Transmitting metrics for each node in the path provides all the data needed for a child to select a parent node and corresponding path from among multiple potential parent nodes and corresponding paths. Even so, in some embodiments, transmitting metrics for each node may consume excessive energy due to increased bandwidth used to transmit the metrics, cause increased transmission latency, and increase complexity for the child when selecting a parent node and corresponding path.

Therefore, additionally or alternatively, node 200 may transmit metrics for the node that exhibits the worst case set of metrics with respect to remaining battery life. The worst-case node may be node 200 or may be any intermediate node between node 200 and control center 130. As a result, the amount of data transmitted by node 200 is reduced relative to transmitting a table with metrics for all nodes in the path.

Additionally or alternatively, node 200 may transmit a composite metric that represents the remaining battery life for the set of nodes along the path from node 200 to control center 130, exclusive of node 200. In such cases, node 200 receives a composite metric from the parent node of node 200. Node 200 combines various metrics for 200, such as battery burn rate, composite consumption, sacrificial node designation, sacrificial node deration value, and/or the like, into a composite metric representing remaining battery life for node 200. Node 200 combines the metric received from the parent node with the metric for node 200 to generate a metric that represents the remaining battery life for the set of nodes along the path from node 200 to control center 130, inclusive of node 200.

One such approach to combining the metrics includes the use of a triangular norm function, also referred to herein as a t-norm. T-norms are operations that are performed on two or more operands, where the operands are in the range of 0 to 1, inclusive. T-norms are commutative, associative, and monotonic. As a result, a t-norm used to generate the composite metric for a set of nodes in a path may combine the metrics in any order without changing the value of the composite metric. Further, a composite metric representing the remaining battery life for the set of nodes along the path from node 200 to control center 130, exclusive of node 200, may be combined with the metric for node 200 using a t-norm to generate the composite metric for the set of nodes along the path that also includes node 200. The resulting composite metric represents the remaining battery life for the set of nodes along the path from node 200 to control center 130, inclusive of node 200. This characteristic holds regardless of the number of nodes between node 200 and control center 130.

One example t-norm is a minimum t-norm. A minimum t-norm generates a value that represents the minimum value from among the operands. For example, a minimum t-norm applied to the values 0.5, 0.3, and 0.6 generates a result of 0.3. Similarly, a minimum t-norm applied to the values 0.75 and 0.44 generates a result of 0.44. In the present disclosure, each operand represents the remaining battery life of a corresponding node, where 0 represents a worst-case remaining battery life and 1 represents a best-case remaining battery life. As a result, a composite metric generated using a minimum t-norm generates a composite metric representing the worst-case remaining battery life from among the corresponding set of nodes. Therefore, a composite metric generated using a minimum t-norm preferentially selects a path whose worst-case node has a high remaining battery life relative to the worst-case nodes from among the other potential paths.

Another example t-norm is a product t-norm. A product t-norm generates a value that represents the product obtained by multiplying the values of all the operands. For example, a product t-norm applied to the values 0.5, 0.3, and 0.6 generates a result of 0.09. Similarly, a product t-norm applied to the values 0.75 and 0.44 generates a result of 0.33. Note that, because each operand is in the range of 0 to 1 inclusive, a product t-norm generally decreases as the number of operands increases. As a result, a composite metric generated using a product t-norm represents not only the remaining battery life of the nodes in the path, but also factors in the number of hops representing the path. Therefore, a composite metric generated using a product t-norm preferentially selects a path that includes nodes with relatively high remaining battery life and with a relatively low hop count from node 200 to control center 130.

Yet another example t-norm is a Łukasiewicz t-norm. A two-operand Łukasiewicz t-norm generates the maximum of 0 and the sum of the operands minus one. For example, a Łukasiewicz t-norm applied to the values 0.5, 0.3, and 0.6 generates a result of 0.0. A Łukasiewicz t-norm typically generates a result that is somewhat lower than a product t-norm. A composite metric generated using a Łukasiewicz t-norm represents not only the remaining battery life of the nodes in the path, but also factors in the number of hops representing the path. A Łukasiewicz t-norm also preferentially selects a path that includes nodes with relatively high remaining battery life and with a relatively low hop count from node 200 to control center 130.

Additionally or alternatively, any other technically feasible t-norm may be employed, including a drastic t-norm, a Hamacher t-norm, a Schweizer—Sklar t-norm, and/or the like.

In some embodiments, if a node is designated as a sacrificial node, then the combined metrics computed by any node that includes the sacrificial node are unaffected by the remaining battery life of the sacrificial node. For example, if a composite metric is generated using a t-norm function, then the remaining battery life of the sacrificial node may be set to 1. Because all t-norm functions support the identity property, where $T(A,1)=T(1,A)=A$, a sacrificial node with a remaining battery life of 1 has no effect on the combined metrics for paths that include the sacrificial node.

Node 200 transmits metrics, to child nodes and/or potential child nodes on a periodic basis, such as once per day, once per week, once per month, once per year, and/or the like. Additionally or alternatively, node 200 transmits metrics to a child node or potential child node in response to receiving a request for such metrics from the child node or potential child node.

With respect to the second function, software application 242 selects a path based on metrics received from multiple potential parent nodes. The preferential path may change over time due to additional nodes joining or leaving the wireless network, changes in radio frequency signal propagation over time, and changes in the data load requested from various nodes. Therefore, each node periodically reevaluates an objective function that measures the path cost for each potential path, as further described herein. During this process, software application 242 evaluates paths that existed as of the last discovery process and discovers new potential parents and paths that developed since the last discovery process.

Initially, software application 242 performs the discovery process when node 200 initially joins the wireless network, such as when node 200 is powered on. When searching for a parent node for node 200, software application 242 discovers multiple potential parent nodes through the standard discovery mechanism for the wireless network, as further described herein. As part of that discovery process, or in an additional step after completing the discovery process, each potential parent node transmits metrics associated with remaining battery life to node 200. Software application 242 then applies an objective function for each path associated with each potential parent node, in order to determine an optimal parent node and corresponding path.

After joining the wireless network, software application 242 periodically performs the discovery process at regular maintenance intervals, such as, once per day, once per week, once per month, once per year, and/or the like. In this manner, software application 242 may select a new parent node and corresponding path in order to ensure that the goals of battery optimization are maintained. Software application 242 applies the objective function to the current parent node and corresponding path to determine whether the current parent node and corresponding path are still valid. Additionally or alternatively, software application 242 determines other potential parent nodes and corresponding paths by performing a discovery process. Software application 242 applies the objective function to each potential parent node and corresponding path to determine whether to maintain the current parent node and corresponding path or to select an alternative parent node and corresponding path.

In one example, software application 242 initially performs to join the wireless network when node 200 is powered on. During the discovery process, software application 242 discovers and receives metrics from potential parent nodes A, B, C, and D. Software application 242 applies the objective function to the metrics and, as a result, selects node C as the parent node. Software application 242 joins the wireless network with node C as the parent node until a better path is subsequently discovered. During some subsequent discovery process, software application 242 may determine that node C and/or the corresponding path is no longer available or is performing sub-optimally. For example, one or more nodes in the path corresponding to node C may have experienced increased energy consumption and/or may no longer have excess battery capacity. During the discovery process, software application 242 discovers and receives metrics from additional potential parent nodes A, B, C, R, and T. In this regard, node D may no longer be an active parent node, and nodes R and T may have joined the wireless network subsequent to the prior discovery process. Node T may be a sacrificial node with a deration value of 80%, where the other nodes in the corresponding path have adequate remaining battery life. As a result, software application 242 selects node T as the new parent node. Further, software application 242 transmits metrics associated with the new parent node to child nodes and potential child nodes of node 200. Child and potential child nodes of node 200 then reevaluate potential parent nodes based on the updated metrics received from node 200 and/or other potential parent nodes.

In general, software application 242 selects a path, from node 200 to control center 130, typically via one or more intermediate nodes. Because node 200 may have multiple potential paths to control center 130, software application 242 selects a path based on various criteria. For example, software application 242 may select the path that represents the shortest path from node 200 to control center 130, where the shortest path is the path with the fewest number of hops to reach the control center 130 via intermediate nodes. Selecting the shortest path typically reduces latency relative to longer paths. In addition, selecting the shortest path reduces overall energy consumed by the intermediate nodes due to messages having to be relayed by other nodes, such as node 200. In addition, when selecting a path, software application 242 further selects a path based on one or more other factors, such as quality of data communications in each path, speed and bandwidth of each path, remaining battery in the nodes of each path, and/or the like. When selecting a path that considers these multiple factors, software application 242 applies an objective function based on these various factors. The objective function, thereby, generates a value, referred to herein as path cost, that is indicative of the desirability of each potential path. Software application 242, therefore, selects a parent node, and the path associated with that parent node, based on the value of the objective function for the potential paths. Exemplary objective functions are now described.

The objective function may be a weighted equation, a sequential rule-based technique, and/or the like. With respect to a weighted equation, the objective function may be expressed in the form shown in Equation 1 below:

$$Z = A_{x1} + B_{x2} + C_{x3} \ldots + N_{xn} \qquad (1)$$

where x1, x2, x3, ... xn are values for various parameters, A, B, C, ... N are the corresponding weights for the various parameters and Z is the value of the objective function. For each potential parent node, software application 242 applies the objective function to the metrics received from the potential parent node to determine the value Z. Software application 242 ranks the values of the objective function for the potential parent nodes and selects the parent node associated with the highest value of Z.

In one example, x1 may represent the battery burn rate, x2 may represent the composite consumption, and x3 may represent the sacrificial node deration value for the corresponding node. Additional metrics, such as xn, may represent other factors, such as the number of additional messages the is able to relay, a number of remaining child node connections, a number of hops to control center 130, an indicator of signal quality, and/or the like. The weights A, B, and C may be 0.0002, 1, and 5, indicating the relative importance of each of the metrics included in the objective function. Any one or more of the weights may be increased or decreased based on the goals, operating situation, and use case for the nodes in the wireless network.

With respect to a sequential rule-based technique, the objective function may be expressed as a series of steps to perform for each potential parent node. Typically, with a sequential rule-based technique, software application 242 applies a first rule to one or more metrics and compares the result of the rule for each potential parent. If two or more potential parent nodes produce equal, or substantially equal, results after applying the first rule, then software application 242 applies a second rule. If two or more potential parent nodes produce equal, or substantially equal, results after applying the second rule, then software application 242 applies a third rule, and so on.

In one example, software application 242 may apply a first rule to determine whether any potential parent node is associated with a path that includes a sacrificial node with a deration value that is greater than 50%. If one potential parent node includes such a sacrificial node, then software application 242 selects that potential parent node. If more than one potential parent node includes such a sacrificial node, then software application 242 applies a second rule to compare the deration values. If the highest deration value for a potential parent node is at least 10% above the deration values for other potential parent nodes, then software application 242 may select the potential parent node with the highest deration value. If the highest deration value for a potential parent node is less than 10% above the deration values for one or more other potential parent nodes, then software application 242 may apply a third rule to select a potential parent node associated with a node that has the lowest composite consumption. If the two lowest composite consumptions are within 5% of each other, then software application applies a fourth rule to select the potential parent node with the lowest battery burn rate. Similarly, if no potential parent node is associated with a path that includes a sacrificial node with a deration value that is greater than 50%, then software application 242 may apply a fifth rule to select a potential parent node associated with a node that has the lowest composite consumption. If the two lowest composite consumptions are within 5% of each other, then software application applies a sixth rule to select the potential parent node with the lowest battery burn rate. The order of any of the rules may be changed and/or the thresholds associated with any one or more of the rules may be increased or decreased based on the goals, operating situation, and use case for the nodes in the wireless network.

In another example, software application 242 may apply a first rule to compare the composite metrics for the potential parent nodes and select the potential parent node with the highest composite metric. If two potential parent nodes have the same composite metric, or have composite metrics that are within 5% of each other, then software application 242 may apply a first rule to select the potential parent node with the highest sacrificial node deration value.

In some embodiments, one or more of the border router nodes 112 of FIG. 1 may be deployed as battery powered device nodes. In such embodiments, node 200 may include metrics associated with battery powered border router nodes 112 when selecting a path between node 200 and control center 130. For example, node 200 may select a path that includes the battery powered border router node 112 that has the highest remaining battery life relative to other battery powered border router nodes 112.

Power-Efficient Parent and Path Selection Process

Figure 3:
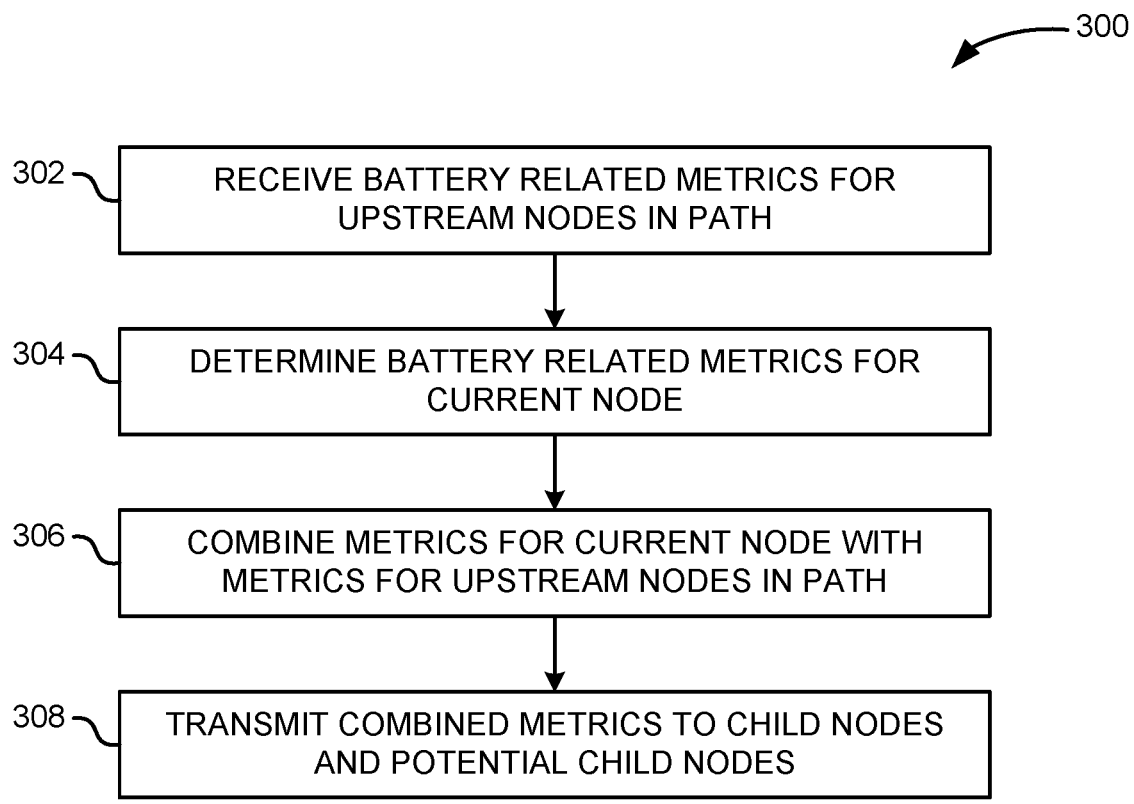
FIG. 3 sets forth a flow diagram of method steps for determining a path cost metric based on battery life data for a set of nodes, according to various embodiments.

FIG. 3 sets forth a flow diagram of method steps for determining a path cost metric based on battery life data for a set of nodes, according to various embodiments. Although the method steps are described in conjunction with the systems of FIGS. 1-2, persons skilled in the art will understand that any system may be configured to perform the method steps in any order.

As shown, a method 300 begins at step 302 where a software application 242 executing on a processor 220 included in a node 200 receives battery related metrics for upstream nodes in the path. The battery related metrics may include a battery burn rate that measures a short-term average of daily battery consumption over a recent period, such as two months, three months, six months, and/or the like. The battery related metrics may further include a composite consumption of the battery over the guaranteed or target lifetime of node 200. The battery related metrics may further include an indicator that one or more upstream nodes are designated as sacrificial nodes. The battery related metrics may further include a deration value indicating an amount by which to derate one or more metrics associated with a sacrificial node. Software application 242 may receive a table of metrics that includes an entry for each upstream node between node 200 and control center 130. Alternatively, software application 242 may receive metrics for a single upstream node that is associated with the lowest remaining battery life. Additionally or alternatively, the software application 242 may receive a composite metric that represents the remaining battery life associated with the set of upstream nodes.

At step 304, software application 242 determines battery related metrics for the current node. Again, the battery related metrics may include a battery burn rate, a composite consumption, a sacrificial node indicator, and a deration value.

At step 306, software application 242 combines the metrics for the current node with the received metrics for the upstream nodes. If the received metrics for the upstream node includes a table with entries for each upstream node, software application 242 adds a new entry to the table that includes the metrics for the current node. If the received metrics includes the metrics for the upstream node that is associated with the lowest remaining battery life, then software application 242 compares the received remaining battery life with the battery life of the current node 200. If the received remaining battery life is greater than the battery life of the current node 200, then software application 242 replaces the received metrics with the metrics determined for the current node 200. Otherwise, software application 242 maintains the received metrics. If the received metrics includes a composite metric that represents remaining battery life associated with the set of upstream nodes, then software application 242 determines a composite metric for the current node 200 by combining the composite metric received from the parent node with the metric for current node 200, such as by using a t-norm. Software application 242 replaces the received composite metric with the new composite metric that also factors in the metric for current node 200.

At step 308, software application 242 transmits the combined metrics to child nodes and potential child nodes. Software application 242 may transmit a table of metrics that includes an entry for each upstream node, inclusive of node 200. Alternatively, software application 242 may transmit metrics for the node that is associated with the lowest remaining battery life, which may either be node 200 or an upstream node. Additionally or alternatively, the software application 242 may transmit the composite metric generated from the upstream composite metric and the metric for the current node 200. Software application 242 may transmit the metrics on a periodic basis, such as once per day, once per week, once per month, once per year, and/or the like. Additionally or alternatively, node 200 transmits metrics to a child node or potential child node in response to receiving a request for such metrics from a child node or potential child node.

Figure 4:
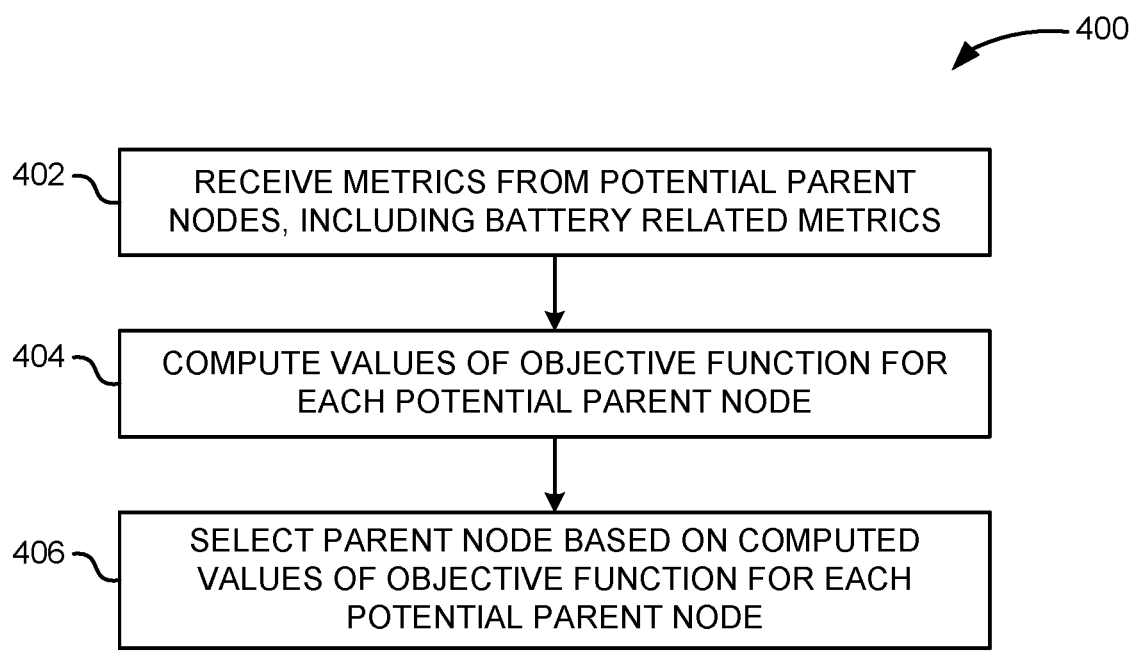
FIG. 4 sets forth a flow diagram of method steps for selecting a potential parent node with which to pair, according to various embodiments.

FIG. 4 sets forth a flow diagram of method steps for selecting a potential parent node with which to pair, according to various embodiments. Although the method steps are described in conjunction with the systems of FIGS. 1-2, persons skilled in the art will understand that any system may be configured to perform the method steps in any order.

As shown, a method 400 begins at step 402, where a software application 242 executing on a processor 220 included in a node 200 receives metrics from potential parent nodes. The metrics may include a battery burn rate that measures a short-term average of daily battery consumption over a recent period, such as two months, three months, six months, and/or the like. The metrics may further include a composite consumption of the battery over the guaranteed or target lifetime of node 200. The metrics may further include an indicator that one or more upstream nodes are designated as sacrificial nodes. The metrics may further include a deration value indicating an amount by which to derate one or more metrics associated with a sacrificial node. The metrics may include other values, such as remaining message capacity, remaining child node connections, number of hops to control center 130, signal quality, and/or the like. Software application 242 may receive a table of metrics that includes an entry for each upstream node between node 200 and control center 130. Alternatively, software application 242 may receive metrics for a single upstream node that is associated with the lowest remaining battery life. Additionally or alternatively, the software application 242 may receive a composite metric that represents remaining battery life associated with the set of upstream nodes.

At step 404, software application 242 computes a value for an objective function for each potential parent node. The objective function may be a weighted equation that applies weights to one or more metrics, such as a battery burn rate, composite consumption, sacrificial node deration value, remaining message capacity, remaining child node connections, number of hops to control center 130, signal quality, and/or the like. Additionally or alternatively, the objective function may be a sequential rule-based technique, where the objective function may be expressed as a series of steps to perform for each potential parent node. Typically, with a sequential rule-based technique, software application 242 applies a first rule to one or more metrics and compares the result of the rule for each potential parent. If two or more potential parent nodes produce equal, or substantially equal, results after applying the first rule, then software application 242 applies a second rule. If two or more potential parent nodes produce equal, or substantially equal, results after applying the second rule, then software application 242 applies a third rule, and so on.

At step 406, software application 242 selects a parent node based on the computed values for the object objective function for each potential parent node. In some embodiments, software application 242 selects the parent node associates with a path that has the highest remaining battery life, based on the values generated from the objective function.

In sum, a wireless network includes a plurality of nodes, each of which is configured to implement an improved parent and path selection process to efficiently and reliably manage battery life of the plurality of nodes. To implement the parent and path selection process, a given node implements a technique to determine a metric based on remaining battery life of the nodes in the currently selected path. Upon request from another node, the given node transmits the metric to the requesting node.

When a given node selects a new path, the node transmits requests to multiple nodes, each of which is a potential parent node for the given node. In response to the requests, each potential parent node transmits a metric to the requesting node, where the metric is indicative of the remaining battery life of the nodes in the path that includes the respective potential parent node. After receiving the metrics from the potential parent nodes, the given node selects a parent node, and corresponding path, based on the metrics. As a result, the given node selects a path that optimizes battery consumption of the various BPD nodes in the wireless network. The given node may further select a path based upon metrics not related to battery life, including remaining message capacity, remaining child node connections, number of hops to control center 130, signal quality, and/or the like At least one technical advantage of the disclosed techniques relative to the prior art is that, with the disclosed techniques, nodes within a wireless network can select a parent and a path based on remaining battery life of nodes in the wireless network. The path selection process preferentially selects a routing path that includes BPD nodes that are less likely to prematurely exhaust the remaining battery life, relative to the nodes in the other potential paths. The disclosed techniques may thereby reduce the number of BPD nodes that need repair and/or replacement due to battery failure prior to the guaranteed or target lifetime of the BPD node. As a result, energy consumption of nodes in the wireless network is managed with greater accuracy, thereby extending the operational lifetime of BPD nodes. These advantages represent one or more technological improvements over prior art approaches.

1. In some embodiments, a first node resides within a wireless network, the first node comprising: a memory storing instructions; and a processor that is coupled to the memory and, when executing the instructions: receives data associated with remaining battery life of one or more other nodes that reside within the wireless network; determines a value representing a remaining battery life of the first node; computes a metric based on at least one of the remaining battery life of the one or more other nodes or the remaining battery life of the first node; and transmits the metric to a second node within the wireless network.

2. The first node of clause 1, wherein the one or more other nodes reside on a path between the first node and a head node, and wherein the second node is at least one of a child node or a potential child node.

3. The first node of clause 1 or clause 2, wherein the data associated with the remaining battery life of the one or more other nodes comprises a table that includes, for each respective node of the one or more other nodes, a corresponding metric associated with a remaining battery life of the respective node.

4. The first node of any of clauses 1-3, wherein the data associated with the remaining battery life of the one or more other nodes comprises a composite metric based on a remaining battery life of each node included in the one or more other nodes.

5. The first node of any of clauses 1-4, wherein the composite metric is based on a minimum battery life from among the remaining battery lives of each of the one or more other nodes.

6. The first node of any of clauses 1-5, wherein the composite metric is based on a value computed by multiplying together the remaining battery lives of each of the one or more other nodes.

7. The first node of any of clauses 1-6, wherein the processor, when executing the instructions, further: determines that the first node is designated as a sacrificial node; and in response, increases the value representing the remaining battery life of the first node.

8. The first node of any of clauses 1-7, wherein the processor, when executing the instructions, further determines that the first node is designated as a sacrificial node, wherein the metric is unaffected by the remaining battery life of the first node.

9. The first node of any of clauses 1-8, wherein the processor, when executing the instructions, further: determines that at least one of the first node and a third node included in the one or more other nodes is designated as a sacrificial node; and in response, transmits an indicator to the second node that a path associated with the first node includes a node designated as a sacrificial node.

10. In some embodiments, a first node resides within a wireless network, the first node comprising: a memory storing instructions; and a processor that is coupled to the memory and, when executing the instructions: receives a first metric from a first potential parent node included in the wireless network, the first metric indicating a remaining battery life associated with a first path to a head node that includes the first potential parent node; receives a second metric from a second potential parent node included in the wireless network, the second metric indicating a remaining battery life associated with a second path that includes the second potential parent node; and selects a parent node from the first potential parent node or the second potential parent node based at least in part on the first metric and the second metric.

11. The first node of clause 10, wherein the processor, when executing the instructions, further: determines that the first metric indicates a higher remaining battery life than the second metric; and in response, selects the first potential parent node as the parent node.

12. The first node of clause 10 or clause 11, wherein the processor, when executing the instructions, further: determines that the first metric and the second metric are equal; determines that the first path includes a sacrificial node; determines that the second path does not include a sacrificial node; and in response, selects the first potential parent node as the parent node.

13. The first node of any of clauses 10-12, wherein the first metric reflects a first path cost associated with the first potential parent node, and wherein the second metric reflects a second path cost associated with the second potential parent node.

14. In some embodiments, one or more non-transitory computer-readable media store program instructions that, when executed by one or more processors, cause the one or more processors to perform the steps of: receiving data associated with remaining battery life of one or more other nodes that reside within a wireless network; determining a value representing a remaining battery life of a first node; computing a metric based on at least one of the remaining battery life of the one or more other nodes or the remaining battery life of the first node; and transmitting the metric to a second node within the wireless network.

15. The one or more non-transitory computer-readable media of clause 14, wherein the one or more other nodes reside on a path between the first node and a head node, and wherein the second node is at least one of a child node or a potential child node.

16. The one or more non-transitory computer-readable media of clause 14 or clause 15, wherein the data associated with the remaining battery life of the one or more other nodes comprises a table that includes, for each respective node of the one or more other nodes, a corresponding metric associated with a remaining battery life of the respective node.

17. The one or more non-transitory computer-readable media of any of clauses 14-16, wherein the data associated with the remaining battery life of the one or more other nodes comprises a composite metric based on a remaining battery life of each node included in the one or more other nodes.

18. The one or more non-transitory computer-readable media of any of clauses 14-17, wherein the composite metric is based on a minimum battery life from among the remaining battery lives of each of the one or more other nodes or a value computed by multiplying together the remaining battery lives of each of the one or more other nodes.

19. The one or more non-transitory computer-readable media of any of clauses 14-18, wherein the instructions further cause the one or more processors to perform the steps of: determining that the first node is designated as a sacrificial node; and in response, increasing the value representing the remaining battery life of the first node.

20. The one or more non-transitory computer-readable media of any of clauses 14-19, wherein the instructions further cause the one or more processors to perform the steps of: determining that at least one of the first node and a third node included in the one or more other nodes is designated as a sacrificial node; and in response, transmitting an indicator to the second node that a path associated with the first node includes a node designated as a sacrificial node.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
receiving, by a first node in a mesh network from a second node in the mesh network, a first battery life metric for a path through the mesh network;
determining, by the first node, a value representing a remaining battery life of the first node;
calculating, by the first node, a second battery life metric based on at least one of the first battery life metric for the path or the value representing the remaining battery life for the first node; and
transmitting, by the first node to a third node in the mesh network, the second battery life metric.

2. The method of claim 1, wherein the path is between the second node and a fourth node in the mesh network.

3. The method of claim 1, wherein the second battery life metric is for a path between the first node and a fourth node in the mesh network.

4. The method of claim 1, wherein the first battery life metric is based on a minimum battery life from among respective remaining battery lives of individual nodes of a plurality of nodes along the path.

5. The method of claim 1, wherein the first battery life metric comprises a composite metric based on respective remaining battery lives of individual nodes of a plurality of nodes along the path.

6. The method of claim 5, wherein the composite metric is based on a value calculated by multiplying together the respective remaining battery lives of the individual nodes of the plurality of nodes along the path.

7. The method of claim 1, further comprising in response to determining that the first node is designated as a sacrificial node, increasing, by the first node, the value representing the remaining battery life of the first node.

8. The method of claim 1, further comprising in response to determining that the first node is designated as a sacrificial node, calculating, by the first node, the second battery life metric independent of the value representing the remaining battery life for the first node.

9. A method comprising:
receiving, by a first node in a mesh network, respective battery life metrics for individual paths in a set of paths from the first node to a second node in the mesh network;
selecting, by the first node, a first path from the set of paths based on the respective battery life metrics; and
transmitting, by the first node, a message to the second node using the first path.

10. The method of claim 9, wherein selecting the first path based on the respective battery life metrics comprises determining that a first respective battery life metric for the first path is a largest one of the respective battery life metrics.

11. The method of claim 9, wherein selecting the first path based on the respective battery life metrics comprises:
determining that a first respective battery life metric for the first path is a largest one of the of the respective battery life metrics;
determining that the first respective battery life metric is equal to a second respective battery life metric for a second path from the set of paths;
determining that the first path includes a sacrificial node; and
determining that the second path does not include a sacrificial node.

12. The method of claim 9, wherein a first respective battery life metric for the first path is received from a neighboring node of the first node that is along the first path.

13. The method of claim 9, wherein a first respective battery life metric for the first path is a composite metric based on respective remaining battery lives of individual nodes of a plurality of nodes along the first path.

14. The method of claim 13, wherein the composite metric is based on a value computed by multiplying together the respective remaining battery lives of the individual nodes of the plurality of nodes along the first path.

15. The method of claim 9, wherein a first respective battery life metric for the first path is based on a minimum battery life from among respective remaining battery lives of individual nodes of a plurality of nodes along the first path.

16. A first node in a mesh network, comprising:
one or more processors; and
a memory storing executable instructions that, when executed by the one or more processors, cause the one or more processors to:
receive, from a second node in the mesh network, battery life information for a path through the mesh network;
determine an amount indicating a remaining battery life of the first node;
determine a battery metric based on at least one of the battery life information for the path or the amount indicating the remaining battery life of the first node; and
send, to a third node in the mesh network, the battery metric.

17. The first node of claim 16, wherein the battery life information comprises a table that includes respective remaining battery life information for individual nodes of a plurality of nodes along the path.

18. The first node of claim 16, wherein the battery life information comprises a composite battery life metric based on respective remaining battery information of individual nodes of a plurality of nodes along the path.

19. The first node of claim 18, wherein to determine the battery metric, the one or more processors are caused to multiply the amount indicating the remaining battery life of the first node and the composite battery life metric to generate the battery metric.

20. The first node of claim 18, wherein to determine the battery metric for the path, the one or more processors are caused to select a smaller of the amount indicating the remaining battery life of the first node and the composite battery life metric as the battery metric.

* * * * *